US012744713B2

(12) United States Patent
Khirallah et al.

(10) Patent No.: US 12,744,713 B2

(45) Date of Patent: Sep. 22, 2026

(54) METHOD AND APPARATUS FOR SUPPORTING ARTIFICIAL INTELLIGENCE AND MACHINE LEARNING IN WIRELESS COMMUNICATION SYSTEM

(71) Applicant: Samsung Electronics Co., Ltd., Suwon-si (KR)

(72) Inventors: Chadi Khirallah, Staines (GB); Joan Pujol Roig, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/428,560

(22) Filed: Jan. 31, 2024

(65) Prior Publication Data

US 2024/0283710 A1 Aug. 22, 2024

(30) Foreign Application Priority Data

Dec. 19, 2023 (GB) ..................................... 2319539

(51) Int. Cl.
*H04L 41/16* (2022.01)
*H04L 41/06* (2022.01)
*H04W 24/02* (2009.01)

(52) U.S. Cl.
CPC .............. *H04L 41/16* (2013.01); *H04L 41/06* (2013.01); *H04W 24/02* (2013.01)

(58) Field of Classification Search
CPC ......... H04L 41/06; H04L 41/16; H04W 24/02
See application file for complete search history.

(56) References Cited

U.S. PATENT DOCUMENTS

2016/0028762 A1* 1/2016 Di Pietro ............ H04L 63/1416 726/23
2021/0226860 A1 7/2021 Lee et al.
2022/0006707 A1 1/2022 Dao et al.
2022/0012645 A1* 1/2022 Ying ...................... G06N 20/20
2022/0368605 A1 11/2022 Gao et al.
(Continued)

FOREIGN PATENT DOCUMENTS

CN 111309378 A 6/2020
GB 2627352 A * 8/2024 ......... H04L 41/0853
(Continued)

OTHER PUBLICATIONS

3gpp Tsg-Ran WG3 Meeting 118: TP to 38.423 and 38.420 for unified AI/ML procedures "https://www.3gpp.org/ftp/tsg_ran/WG3_lu/TSGR3_118/Docs" (Year: 2022).*
(Continued)

*Primary Examiner* — Douglas B Blair
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method for supporting Artificial Intelligence/Machine Learning (AI/ML) by a first network entity in a wireless communication system is provided. The method includes transmitting, to a second network entity, a data collection request message related to data collection for supporting the AI/ML, and receiving, from the second network entity, a data collection response message based on a successful operation related to the data collection.

17 Claims, 7 Drawing Sheets

(56) References Cited

U.S. PATENT DOCUMENTS

| | | | | |
|---|---|---|---|---|
| 2024/0088968 | A1* | 3/2024 | Lo | H04W 24/10 |
| 2024/0137783 | A1* | 4/2024 | Kovács | H04W 24/02 |
| 2025/0047571 | A1* | 2/2025 | Zhang | H04L 67/12 |
| 2025/0056291 | A1* | 2/2025 | Peng | H04L 41/16 |
| 2025/0203505 | A1* | 6/2025 | Muhammad | H04W 52/0206 |
| 2025/0219898 | A1* | 7/2025 | Li | H04L 41/0803 |
| 2026/0113244 | A1* | 4/2026 | Ding | H04L 41/14 |

FOREIGN PATENT DOCUMENTS

| | | | | |
|---|---|---|---|---|
| WO | WO-2022026482 | A1 * | 2/2022 | H04W 24/02 |
| WO | 2022/148611 | A1 | 7/2022 | |
| WO | 2023/148010 | A1 | 8/2023 | |

OTHER PUBLICATIONS

ZTE, TP to 38.423 and 38.420 for unified AI/ML procedures, R3-226743, 3GPP TSG-RAN WG3 Meeting, 3GPP TSG- RAN WG3 Meeting #118, Toulouse, Nov. 14-18, 2022.

International Search Report and written opinion dated Apr. 25, 2024, issued in International Application No. PCT/KR2024/001328.

Qualcomm, New SI: Study on Artificial Intelligence (AI)/Machine Learning (ML) for NR Air Interface, RP-213599, Dec. 17, 2021.

3GPP, 3rd Generation Partnership Project; Technical Specification Group Radio Access Network; NG-RAN; NG Application Protocol (NGAP) (Release 17), 3GPP TS 38.413 V17.6.0, Sep. 2023.

ETSI, Technical Specification 3GPP 5G; 5G; NG-RAN; Xn Application Protocol (XnAP) (3GPP TS 38.423 version 16.2.0 Release 16), ETSI TS 138 423, V16.2.0, Jul. 2020.

ETSI, Technical Specification 3GPP 5G; 5G; NR; Radio Resource Control (RRC); Protocol specification (3GPP TS 38.331 version 16.1.0 Release 16), ETSI TS 138 331 V16.1.0, Jul. 2020.

Sato et al., Continuous Delivery for Machine Learning, https://martinfowler.com/articles/cd4ml.html, Sep. 19, 2019.

Sharifi et al., Identifying the Hazard Boundary of ML-enabled Autonomous Systems Using Cooperative Co-Evolutionary Search, Oct. 16, 2023.

Combined Search and Examination report dated Jun. 3, 2024, issued in United Kingdom Application 2319539.9.

GB Office Action dated Feb. 4, 2026, issued in GB Application No. GB2319539.9.

* cited by examiner

METHOD AND APPARATUS FOR SUPPORTING ARTIFICIAL INTELLIGENCE AND MACHINE LEARNING IN WIRELESS COMMUNICATION SYSTEM

CROSS-REFERENCE TO RELATED APPLICATION(S)

This application is based on and claims priority under 35 U.S.C. § 119(a) of a United Kingdom patent application number 2302324.5, filed on Feb. 17, 2023, in the United Kingdom Intellectual Property Office, and of a United Kingdom patent application number 2319539.9, filed on Dec. 19, 2023, in the United Kingdom Intellectual Property Office, the disclosure of each of which is incorporated by reference herein in its entirety.

BACKGROUND

1. Field

The disclosure relates to Artificial Intelligence (AI) and/or Machine Leaning (ML) data collection and model monitoring. More particularly, the disclosure relates to methods, apparatus, and systems for AI and/or ML data collection and model monitoring in a 3rd Generation Partnership Project (3GPP) networks such as 5th Generation (5G) networks.

2. Description of Related Art 5G mobile communication technologies define broad frequency bands such that high transmission rates and new services are possible, and can be implemented not only in "Sub 6 GHz" bands such as 3.5 gigahertz (GHz), but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

Herein, the following documents are referenced:

[1] 3GPP RP-213599, Study on Artificial Intelligence (AI)/Machine Learning (ML) for NR Air Interface.

[2] 3GPP TS 38.413 V17.3.0

[3] 3GPP TS 38.423 V17.3.0

[4] 3GPP TS 38.331 V17.3.0

3GPP has started studying the benefits of introducing AI/ML solutions to communications networks, for example, enhancement of management and orchestration, performance, resource allocation, in addition to reduction of complexity and overhead in the network [1].

Moreover, 3GPP is exploring aspects of AI/ML model Life Cycle Management (LCM), for example, model training, model deployment, model monitoring, etc., in addition to enhancement of data collection for AI/ML in communications networks [1].

Model monitoring refers to the control and evaluation of the performance of a ML model to determine whether or not it is operating properly and efficiently. When the AI/ML model experiences some performance decay, appropriate maintenance actions should be taken to restore performance. AI/ML analytics and AI/ML model outputs are expected to drive most strategic decisions in beyond 5G (B5G) and 6G application functions and network orchestration entities. However, the performance of AI/ML models degrades over time. This can lead to non-optimal decisions, which lead to performance degradation, reduction in quality of experience (QoE).

Accordingly, the 3rd Generation Partnership Project (3GPP) is exploring the concept of model monitoring to ensure the proper functioning and performance of AI/ML models deployed in telecommunications networks and/or UEs. The aim of model monitoring is to allow network operators and/or AI/ML life-cycle management entities to make informed decisions regarding the activation, deactivation, selection, switching, fallback, and update of AI/ML models, and/or other related AI/ML operation.

In addition to model monitoring, effective and comprehensive data collection for AI/ML operations is also of importance to the management of AI/ML operations.

However, the following are some of the problems facing 3GPP work on AI/ML:

1) Existing data collection mechanisms and procedures may not be able to address different requirements of AI/ML operations in wireless networks;
2) Lack of framework, procedures and/or network entities to handle model monitoring in communications networks.

3GPP RANI and RAN3 agreements relevant to the disclosure are set out in Appendix I and Appendix II.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods, apparatus, and systems for AI and/or ML data collection and model monitoring in 3GPP networks such as 5G networks.

Another aspect the disclosure is to provide novel mechanisms, framework, signalling, procedures and new or adapted network entities and functions for data collection and monitoring of AI/ML model operations in communications networks.

Additional aspects will be set forth in part in the description which follows and, in part, will be apparent from the description, or may be learned by practice of the presented embodiments.

In accordance with an aspect of the disclosure, a method for supporting artificial intelligence/machine learning (AI/ML) by a first network entity in a wireless communication system is provided. The method includes transmitting, to a second network entity, a data collection request message related to data collection for supporting the AI/ML, and receiving, by the first network entity, a data collection response message based on a successful operation related to the data collection.

In accordance with an aspect of the disclosure, a method for artificial intelligence/machine learning (AI/ML) monitoring by a first network entity in a wireless communication system is provided. The method includes transmitting, by the first network entity to a second network entity, a monitoring request message including a request associated with monitoring of an AI/ML model or an AI/ML functionality.

In accordance with an aspect of the disclosure, an apparatus for a first network entity for supporting artificial intelligence/machine learning (AI/ML) in a wireless communication system is provided. The apparatus includes a transceiver, memory, and one or more processors coupled to the transceiver and the memory, wherein the memory store one or more computer programs including computer-executable instructions that, when executed by the one or more processors, cause the apparatus to transmit, to a second network entity, a data collection request message related to data collection for supporting the AI/ML, and receive, from the second network entity, a data collection response message based on a successful operation related to the data collection.

In accordance with an aspect of the disclosure, one or more non-transitory computer-readable storage media storing instructions which, when executed by at least one processor of an apparatus of a first network entity in a wireless communication system, cause the apparatus to perform operations are provided. The operations include transmitting, to a second network entity, a data collection request message related to data collection for supporting artificial intelligence/machine learning (AI/ML), and receiving, from the second network entity, a data collection response message based on a successful operation related to the data collection.

The disclosure is defined in the independent claims. Advantageous features are defined in the dependent claims.

Various embodiments or examples disclosed in the description and/or figures falling outside the scope of the claims are to be understood as examples useful for understanding the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
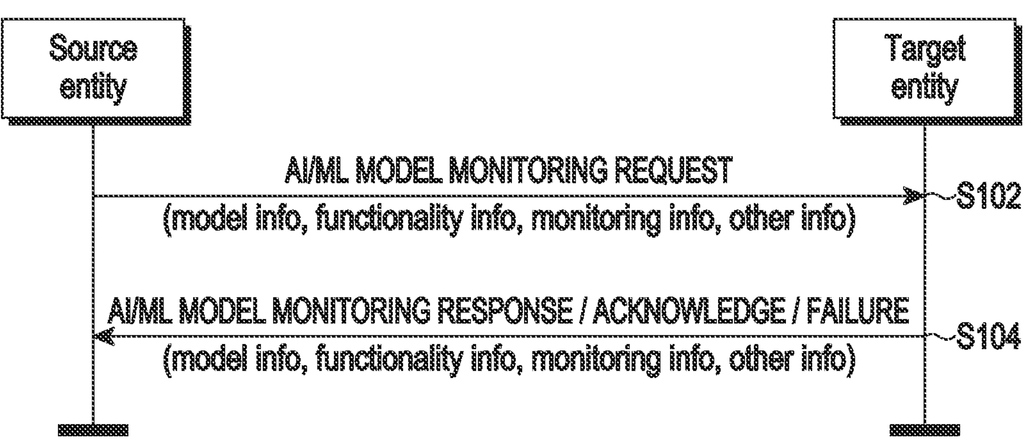
FIG. 1 provides an example of an AI/ML model (or model functionality) monitoring procedure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surface.

The same or similar components may be designated by the same or similar reference numerals, although they may be illustrated in different drawings.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim are to be understood to be applicable to any other aspect, embodiment, example or claim described herein unless incompatible therewith.

Certain examples of the disclosure provide techniques relating to Artificial Intelligence (AI) and/or Machine Leaning (ML) data collection and model monitoring. For example, certain examples of the disclosure provide methods, apparatus and systems for AI and/or ML data collection and model monitoring in a 3rd Generation Partnership Project (3GPP) 5th Generation (5G) network. However, the skilled person will appreciate that the disclosure is not limited to these examples, and may be applied in any suitable system or standard, for example one or more existing and/or future generation wireless communication systems or standards, including any existing or future releases of the same standards specification, for example 3GPP 5G.

The following examples are applicable to, and use terminology associated with, 3GPP 5G. However, the skilled person will appreciate that the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function or purpose within the network.

The skilled person will also appreciate that the transmission of information between network entities/functions is not limited to the specific form, type or order of messages described in relation to the examples disclosed herein.

A particular network entity or network function may be implemented as a network element on a dedicated hardware, as a software instance running on a dedicated hardware, on a logical entity or function, and/or as a virtualized function instantiated on an appropriate platform, e.g. on a cloud infrastructure.

The skilled person will appreciate that the disclosure is not limited to the specific examples disclosed herein. For example:

- The techniques disclosed herein are not limited to 3GPP 5G.

- One or more network entities/functions in the examples disclosed herein may be replaced with one or more alternative network entities/functions performing equivalent or corresponding functions, processes or operations.
- One or more of the messages in the examples disclosed herein may be replaced with one or more alternative messages, signals or other type of information carriers that communicate equivalent or corresponding information.
- One or more further network entities/functions and/or messages may be added to the examples disclosed herein.
- One or more non-essential network entities/functions and/or messages may be omitted in certain examples.
- The functions, processes or operations of a particular network entity/function in one example may be divided between two or more separate network entities/functions in an alternative example.
- The functions, processes or operations of two or more separate network entities/functions in one example may be performed by a single network entity/function in an alternative example.
- Information carried by a particular message in one example may be carried by two or more separate messages in an alternative example.
- Information carried by two or more separate messages in one example may be carried by a single message in an alternative example.
- The order in which operations are performed and/or the order in which messages are transmitted may be modified, if possible, in alternative examples.

Certain examples of the disclosure may be provided in the form of an apparatus/device/network entity configured to perform one or more defined network functions and/or a method therefor. Certain examples of the disclosure may be provided in the form of a system (e.g., network or wireless communication system) comprising one or more such apparatuses/devices/network entities, and/or a method therefor.

Note that throughout this disclosure all embodiments, examples, figures, text, that refer to a new network entity and/or network function may also be extended (or used) with existing network entities and/or network functions or a mix of new and existing network entities and network functions. Therefore, particular functionality or signalling is not uniquely associated with a particular network entity/functionality but may be implemented by any suitable network entity/function or combination of suitable network entities/functions.

In all embodiments, examples, proposals, figures, other parts of this disclosure, the term new network entity (and/or network function) may be referred to (or used interchangeably with), for example, the following terms: Source Entity, Source Function, Target Entity, Target Function, Network Entity 1, Network Entity 2, Network Function 1, Network Function 2, Client, Server, Network Entity, Network Function, Next generation Node B (gNB) (Next Generation Radio Access Network (NG-RAN)), Core Network (CN), User Equipment (UE) (or a group of UEs), Model Monitoring Controller (MMC), Edge, database, dedicated external entity or function, or any other suitable naming examples.

All proposals, methods, solutions, description, embodiments, and/or examples, messages/signalling/procedures, and figures, may mention (or express or refer to) the terms "Model", "Functionality", "AI/ML model", or "AI/ML model functionality", interchangeably throughout all this disclosure.

AI/ML Model Monitoring

Disclosed below are examples of proposed AI/ML model monitoring entities that enable the monitoring of AI/ML models in a wireless communications system and also example signalling that may be used to support AI/ML model monitoring functionality. Among others, the following are described.

- A new network function and/or network entity (or a set of network functions and/or set of network entities) that is (are) involved in monitoring operation of an AI/ML model (or multiple models, or a set of models) in a communication network.
- In one example, the new network function(s) and/or network entity(-ies) monitor(s) a given AI/ML model (or multiple models) hosted/stored/located in one (or multiple) network entity(-ies) (and/or network function(s)) and/or a given UE (or a group of UEs), and/or other (e.g. a (dedicated) server, cloud, application, etc).
- In another example, the new network function(s) and/or network entity(-ies) monitor(s) a given AI/ML model (or multiple models) for a given functionality (or use case, scenario, configuration, sub-use case, etc.), or a given model (or multiple models) for multiple functionalities (or use cases, scenarios, configurations, sub-use cases, etc.).
- In another example, the new network function(s) and/or network entity(-ies) monitor(s) a given AI/ML functionality (or multiple functionalities) for a given model or multiple models (or a group of models).
- In another example, the new network function(s) and/or network entity(-ies) request(s) monitoring of a given AI/ML model (or multiple models) hosted/stored/located in one (or multiple) network entity (and/or network function) and/or a given UE (or a group of UEs), and/or other (e.g. a (dedicated) server, cloud, application, etc.).
- In another example, the new network function(s) and/or network entity(-ies) request(s) a given AI/ML model (or multiple models) for a given functionality (or use case, scenario, configuration, sub-use case, etc.), or a given model (or multiple models) for multiple functionalities (or use cases, scenarios, configurations, sub-use cases, etc.).
- In another example, the new network function(s) and/or network entity(-ies) request(s) monitoring of a given AI/ML functionality (or multiple functionalities) for a given model or multiple models (or a group of models).
- The new network function and/or entity (or a set of network entities and/or functions), that require(s) information related to monitoring of at least one AI/ML model operation, from at least one network entity and/or function, may perform, for example, one (or multiple) of the following actions: trigger, initiate, indicate, request, subscribe, notify, modify, provide, report, negotiate, recommend, collect, update, response, inform, process, acknowledge, reject, wait, postpone, do nothing, or any other suitable action related to AI/ML model monitoring process.
- The new network function and/or entity (or a set of network entities and/or functions), that performs monitoring of at least one AI/ML model operation, may perform, for example, one (or multiple) of the following actions: trigger, initiate, indicate, request, subscribe, notify, modify, provide, report, update, collect, response, inform, recommend, process, negotiate, acknowledge, reject, wait, postpone, do nothing, or any other suitable action related to AI/ML model monitoring process.

- The new network entity(-ies) and/or network function(s) may perform one, some, all or a combination of the following (or similar monitoring actions): stop monitoring, start monitoring, pause monitoring, re-start monitoring, end monitoring, update monitoring, modify monitoring, indicate monitoring.
- The new network entity(-ies) and/or network function(s) may perform deactivation/activation of model monitoring process in at least one network entity and/or network function. For example, this deactivation/activation decision may be determined by the same entity (or function), which hosts/stores the model(s), or by at least another different entity (or function) or both the same network entity (and/or function) and at least another (different) network entity (and/or function).
- The new network entity(-ies) and/or network function(s) involved in the monitoring procedure, may select a model (or models) for monitoring process in at least one network entity (and/or network function). For example, the model (or models) maybe hosted/stored in at least one network entity (and/or function).
- The new network entity(-ies) and/or network function(s) involved in the monitoring procedure, may perform selection and activation of a model (or models) for monitoring process, in at least one network entity (and/or network function), jointly or separately or in parallel, etc.
- Model monitoring methods to exchange information related to model monitoring between network entities and/or network functions, located for example, in radio access network (RAN), core network (CN), and/or the UE side, or sever, cloud, Application, or other.
- New signalling procedures, messages, and/or IEs to support the monitoring of AI/ML model operation considering the above newly introduced network function(s)/entities.

These and other aspects of AI/ML model monitoring are described in detail below.

AI/ML Model Monitoring Entity

Although the examples of network entities/network functions that can provide AI/ML model monitoring are described separately below, any of their functionality may be combined into a single network entity/function and/or distributed across one or more network entities/functions.

In one example, a new network function (or a set of network functions) are involved in monitoring an operation of an AI/ML model (or multiple models) in at least one network function. Alternatively, in another example, a new network entity (or a set of network entities) are involved in monitoring operation of an AI/ML model (or multiple models) in at least one network entity.

In another example, the new network entity(-ies) and/or network function(s) monitors a given model (or multiple models) operation and/or performance, etc.

In another example, the new network entity(-ies) and/or network function(s) monitors a given model (or multiple models) operation and/or performance, for one functionality (or multiple functionalities, use case(s), scenarios(s), configuration(s), and/or sub use case(s)).

In another example, the new network entity(-ies) and/or network function(s) request monitoring of a given model (or multiple models) operation and/or performance. In another example, they request monitoring of a given model (or multiple models) operation and/or performance for one functionality (or multiple functionalities, use case(s), scenarios(s), configuration(s), and/or sub use case(s)).

In another example, the new network entity(-ies) and/or network function(s) performing monitoring of a given model (or multiple models) operation and/or performance, indicate(s)/report(s)/inform(s)/send(s) an outcome of a monitoring procedure to at least one new (or existing) network entity and/or network function. In one example, the monitoring process (e.g. monitoring outcome, and/or other monitoring process related parameters) are reported to same and/or different entity (or function) to that (those entities/functions) that requested or performed the monitoring procedure. In another related example, the monitoring process (e.g. monitoring outcome, monitoring metrics, Key Performance Indicators (KPIs), and/or other monitoring process related parameters) may be reported to a new (or existing entity and/or function) that is not involved in the monitoring procedure, for example, a server, cloud, edge, database, dedicated external entity or function, application or other.

In one example, the reporting of a monitoring process (e.g. monitoring outcome, monitoring metrics, KPIs, and/or other monitoring process related parameters) is provided for a given model (or multiple models), for a given functionality or multiple functionalities (use case, scenarios, configuration, sub-use cases, etc.). Monitoring outcome information or monitoring information in general may include any of the following for example, Session identification (ID), Model Identification (explicit Model ID, or implicit ID based on model functionality), Functionality (ID, type, etc.), performance metrics, KPIs, or any other monitoring outcomes.

In one example, the reporting of a monitoring process (e.g. monitoring outcome, monitoring metrics, KPIs, and/or other monitoring process related parameters) to at least one new (or existing) network entity (and/or function) may result in a given action (or multiple actions) at the network entity (and/or function) receiving this monitoring process (e.g. monitoring outcome, monitoring metrics, KPIs, and/or other monitoring process related parameters). In one example, the entity (and/or function) receiving the monitoring information (e.g. outcome, monitoring information) may decide to deactivate a given model (or multiple models), switch to a different model (or models), fallback to a simple solution (like threshold based), or any other model life cycle management operations, or request transfer or delivery of a different model (or models), from at least one new (or existing) network entity, or a server, cloud, database, or other entity. In another example, the entity receiving the monitoring information, may update or change configurations, setting, fine tuning, update, modify, other actions, for an existing model (or models).

In one example, the new network entity and/or network function exchanges information on its monitoring capability with another entity involved in the monitoring. For example, the new network entity and/or network function may send information related to its capability to support a monitoring process, its capability to support/monitor a given AI/ML model (or multiple models), its capability to support a given model ID or a model functionality ID, or its capability to support a model (or multiple models) identified based on a given functionality (or multiple functionalities, use cases, configurations, sub use cases, scenarios, etc.) to at least one new (or existing) network entity and/or network function. This ensures that an entity can perform monitoring for a given model. In other words, monitoring capabilities with respect to AI/ML models may be indicated based on an explicit indication of a model ID or based on an indicated model functionality (i.e. an implicit indication of models).

In one example, the new network entity (and/or network function) may provide an indication of support for a monitoring process as a general capability to support AI/ML model monitoring and/or a more specific support of model monitoring per use case (or per functionality, configuration, scenario, sub-use case, etc.).

In one example, the new function and/or network entity may be located (or co-located) external to the network (or network entities/functions), for example, in a server, cloud, edge, database, dedicated external entity or function.

In one example, the new network function and/or network entity may be located in (or co-located with), RAN, CN, and/or a given UE (or a group of UEs).

In one example, the new function and/or network entity is located in the gNB (or NG-RAN) and performs monitoring for an AI/ML model (or multiple models) located in a given UE (or a group of UEs). In a related example, the gNB (or MG-RAN) may monitor a given model operation for a given functionality or more than one functionality (or use case, sub-use case, configuration, scenario, etc.). In another example, the gNB (NG-RAN) monitors operation of multiple models, e.g. located in a given UE (or a group of UEs), for a given functionality (or use case, sub-use case, configuration, scenario, etc.).

In another example, the new function and/or network entity is located in the Access and Mobility Management Function (AMF) (or Session Management Function (SMF), User Plane Function (UPF), other) and performs monitoring for an AI/ML model (or multiple models) located at a given gNB/NG-RAN (or a group of gNBs/NG-RANs).

In another example, the Access and Mobility Management Function (AMF) (or Session Management Function (SMF), User Plane Function (UPF), other) monitors operation of multiple models, e.g. located in a given gNB/NG-RAN (or multiple gNBs/NG-RANs), for a given functionality (or use case, sub-use case, configuration, scenario, etc.).

In a related example, the AMF (or SMF, UPF, other) may monitor a given model operation for a given functionality or more than one functionality (or use case, sub-use case, configuration, scenario, etc.).

In one example, the new function and/or network entity is located in AMF (or SMF, UPF, other) and performs monitoring for an AI/ML model (or multiple models), or model functionality (or multiple functionalities), located in a given UE (or a group of UEs).

In one example, the new network function and/or network entity (or a set of network entities and/or network functions) that requires information related to monitoring of at least one AI/ML model operation, from at least one network entity and/or network function, may perform, for example, one (or more) of the following actions related to model monitoring process: trigger, initiate, indicate, request, subscribe, notify, modify, provide, report, collect, update, response, inform, process, acknowledge, reject, wait, postpone, do nothing, or any other suitable action related to AI/ML model monitoring process. These actions may be performed internally or with respect to another network entity/function.

In another example, the new network function and/or network entity (or a set of network entities and/or network functions), that performs monitoring of at least one AI/ML model operation, may perform, for example, one (or more) of the following actions related to model monitoring process: trigger, initiate, indicate, request, subscribe, notify, modify, provide, report, collect, update, response, inform, process, acknowledge, reject, wait, postpone, do nothing, or any other suitable action related to AI/ML model monitoring process.

In one example, one (or more) network entity(-ies) (and/or network functions), involved in monitoring of an AI/ML model (or models) operations, exchange capabilities related to the network entity (-ies) (and/or function(s)) support of monitoring procedure for an AI/ML model (or models). In a related example, the capability support can be for general AI/ML monitoring for a model (or models) and/or capability support per AI/ML model functionality (or multiple functionalities) or per use case(s), scenario(s), configuration(s), or sub-use case(s).

As set out above, the term new network entity (and/or network function) may be referred to (or used interchangeably with), for example, the following terms: Source Entity, Source Function, Target Entity, Target Function, Network Entity 1, Network Entity 2, Network Function 1, Network Function 2, Client, Server, Network Entity, Network Function, gNB (NG-RAN), CN, UE (or a group of UE), Model Monitoring Controller (MMC), Edge, database, dedicated external entity or function, or any other suitable naming examples. The following examples make use of the Source and Target-based terms.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor ((AP), e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Referring to FIG. 1, the Source Entity or function (or group of entities or functions), storing/hosting the AI/ML model(s), sends a model monitoring request to at least one network entity (or function). For example, namely a Source Entity (or a Client, or UE, or group of UEs), sends a monitoring request (message) to a Target Entity (or an MMC, NG-RAN, CN entity, other).

Referring to FIG. 1, the network entity performing the model monitoring, for example, namely Target Entity (or MMC) acknowledges the monitoring request message. For example, the Target Entity sends a response to the Source Entity. Additionally, in the response message, the Target Entity includes information related to the monitoring process, monitoring outcome (if available), and/or monitoring parameters (e.g. monitoring time, validity, monitoring criteria, monitoring metrics, monitoring Key Performance Indicators (KPIs), monitoring process ID, monitoring frequency and other). In a related example, the Target Entity may activate the model (or multiple models) monitoring procedure and trigger the start of monitoring procedure, using indication(s) and/or assistance information included in the Response message. In alternative example, the Target Entity may only trigger activation of a model (or multiple model) for monitoring process, and provide information (or recommendation, policies, conditions, thresholds, etc.) on the start time for monitoring procedure, as part of the model monitoring parameters/information, included in the Response message.

In another example, the model monitoring procedure may include more than the Model Monitoring Request and Response messages, for example, a message carrying information related to recommendations, negotiations, actions on monitoring process and/or monitoring parameters, that can be exchanged between both the Source Entity and the Target Entity.

In another example, the activation and/or start of model monitoring at the Source Entity may be triggered by the Source Entity itself based on assistance information from the Target Entity, for example, received in the Monitor Response message. In another example, the Source Entity may obtain recommendation or assistance information on the activation of the start of model monitoring at the Source Entity (or Target Entity) or any other network entity. Optionally, this information is provided in the Model Monitor Response message, or any other message related to model monitoring or model registration for monitoring procedure.

In another example, the model monitoring procedure may be completed in parallel or after completion of model request/response procedure.

Figure 2:
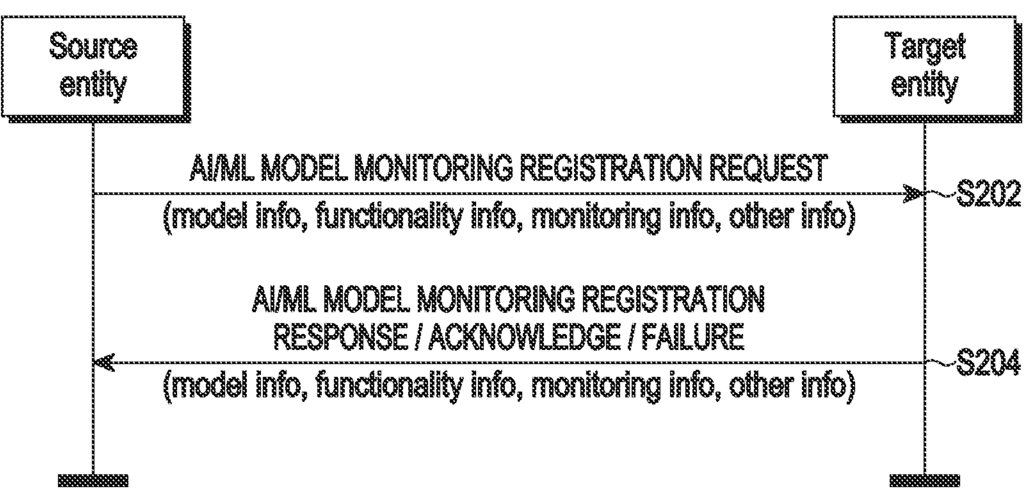
FIG. 2 provides an example of an AI/ML model (or model functionality) monitoring registration procedure according to an embodiment of the disclosure.

Referring to FIG. 2, the Source Entity may include a step/message (or multiple steps/messages) for registration of a given model (or multiple models) for a monitoring process in the Target Entity (or multiple entities and/or functions). The model registration stage could be triggered before (or at the same time of) the monitoring stage. For example,

- Option 1: the Source Entity may send an AI/ML Model Monitoring Request message after receiving an AI/ML Model Monitoring Registration Response (following an AI/ML Model Monitoring Registration Request message) from the Target Entity.
- Option 2: the Source Entity may send an AI/ML Model Monitoring Request message and AI/ML Model Monitoring Registration Request, in parallel (separately) to the Target Entity.
- Option 3: the Source Entity may send an AI/ML Model Monitoring Request message, which includes an AI/ML Model Registration Request message, or vice versa, (i.e. an AI/ML Model Registration Request message, which includes an AI/ML Model Monitoring Request message).
- Other examples or alternatives of the above options are also possible.

In another example, the model may be registered for monitoring at the same entity (and/or function) or at one or more other network entities (and/or functions). Additionally, the registration process may include a monitoring registration session ID, monitoring session ID, model information (e.g. model ID, model functionality, use case, resources needed, etc.), model identification information based on a given functionality (or multiple functionalities) other parameters in a registration request message.

Parameters that may be exchanged between two entities (or more entities) during model monitoring (or any stages of model monitoring) and registration may include any of the following:

- Model monitoring registration information (one or more of the following):
- Source Entity ID, Target Entity ID, Model monitoring registration ID (or model registration ID for monitoring), monitoring (registration) session ID, model ID, model identification based on a given model functionality (or multiple functionalities), functionality ID, registration purpose (e.g., monitoring, training, update, other).
- Model related info (one or more of the following):
- Source Entity ID, Target Entity ID, Model ID, functionality ID(s), use case, scenario, one-side, two-sided model, model identification based on a given model functionality (or multiple functionalities), model resource requirements (CPU, GPU, Memory, etc.), other
- Model monitoring info (one or more of the following):
- Model ID, Model functionality ID, model identification based on a given model functionality (or multiple functionalities), monitoring session ID, monitoring metrics, monitoring criteria, monitoring policy, monitoring accuracy, monitoring conditions, monitoring KPIs, monitoring duration, monitoring stop/start (activation/deactivation), monitoring periodicity, monitoring reporting frequency, monitoring timers, monitoring indication, other monitoring actions, etc.
- Combination of parameters the above
- Other parameters related to monitoring process AI/ML Model Monitoring Signalling All proposed parameters can be included in any message (or messages, or combination of messages) that are mentioned, and/or referred to in this disclosure, for example, in embodiments, examples, and/or figures, etc.

For example, parameters referred to above can be part of any message (or group of messages) that are exchanged between a network entity (or function or UE etc.) and another entity (or a group of entities), for example, messages such as a monitor request, monitor response, monitor register request, monitor register response, monitor indication, monitor notification, monitor report, monitor request acknowledge, other monitoring related actions, etc. may be exchanged between a source entity and a target entity for example.

In an example, the model monitoring registration procedure (or model monitoring procedure) may be defined as a new class 1 procedure, using new and/or existing messages and/or IEs, or defined using existing class 1 procedures, using new and/or existing messages and/or IEs.

In another example, the model monitoring registration procedure (or model registration procedure) maybe defined as a new class 2 procedure, using new and/or existing messages and/or IEs, or defined using existing class 2 procedures, using new and/or existing messages and/or IEs.

FIGS. 1 to 6 provide example signalling procedures for AI/ML model monitoring. Although not described below, it should be noted that other steps, sub-steps, or combined steps are also possible as part of the example signalling procedures for Model Monitoring Registration, or Model Monitoring procedures, but not shown/described above for simplicity. Furthermore, the steps of FIGS. 1 to 6 may also be combined as appropriate. For example, the procedure of FIG. 1 (monitoring request) may follow the procedure of FIG. 2 (monitoring registration).

FIG. 1 provides a signalling diagram of an example class 1 AI/ML model (or model functionality) monitoring procedure according to an embodiment of the disclosure.

Referring to FIG. 1, at operation S102, the Source Entity (or namely Network Entity 1, Network Function, Client, UE, or any other suitable naming) sends a model monitoring request message to at Target Entity (or namely Network Entity 2, Network Function, Server, or any other suitable naming) initiates the model (or model functionality) monitoring procedure by sending a monitoring request (e.g. AI/ML MODEL MONITORING REQUEST message, or AI/ML MODEL FUNCTIONALITY MONITORING REQUEST message) to the Target Entity. The message may include one or more of model information, functionality information, monitoring information and any other relevant information.

In another example, the Source Entity is a UE (or a group of UEs) and sends a model monitoring request to an AMF (SMF, or other 5GC entities and/or functions) (or Mobility Management Entity (MME), other Evolved Packet System (EPS) entities and/or functionalities). That is, the request message may be included in an existing Non-Access Strum (NAS) message/signalling (and/or Ies) or using a newly defined NAS message/signalling (and/or Ies).

In another alternative example, the source entity may send a model monitoring registration request (e.g., AI/ML MODEL MONITORING REGISTRATION REQUEST message, or AI/ML MODEL FUNCTIONALITY MONITORING REGISTRATION REQUEST message) to the target entity, see example in FIG. 2.

The model monitoring message may include information for registration of the model for a monitoring session (e.g. at the target entity). Additionally, the message may include information related to model monitoring, and model (and model functionality, use case, other model related parameters), such as those parameters discussed above.

Optionally, the message may include information related to the model life-cycle-management, for example, information related to model selection, model activation/deactivation, model training, model update, model tuning, model configurations, model training side, model deployment side (e.g. one-sided, two-sided, etc.), other model operation state.

Following operation S102, the Target Entity (or namely Network Entity 2, Network Function, Server, or any other suitable naming) may register a model for monitoring process, and assign a model ID (local or global) and/or monitoring (or monitoring session) ID (local ID or global ID), for the registered model. In another example, the MMC may identify the model in relation to its specific functionality (or use-case/scenario/configuration/site information) (or the model is identified based on its functionality (-ies) or functionality(-ies) ID(s)). In another example, the monitoring session ID is provided included in AI/ML MODEL MONITORING REGISTRATION REQUEST (or AI/ML MODEL MONIOTRING REQEUST message.

Optionally, the Target Entity (or namely Network Entity 2, Network Function, Server, or any other suitable naming) may store information related to model, model monitoring process (e.g. monitoring metrics, KPIs, other) and/or data collection information related to this model (or models) operations, e.g. data collection information for purpose of monitoring.

At operation S104, the Target Entity (or MMC) acknowledges the model monitoring registration request (or model monitoring request), e.g. by sending AI/ML MODEL MONITORING REGISTRATION RESPONSE (or AI/ML MODEL MONIOTRING RESPONSE) message or AI/ML MODEL MONITORING REGISTRATION ACKNOWLEDGE (or AI/ML MODEL MONIOTRING REQUEST ACKNOWLEDGE) message for the success case. The message may include one or more of monitoring related information, monitoring outcome information, a failure case value and any other relevant information, such as information which may be dependent upon the success/failure of the request.

In another example, the Target Entity (or MMC) sends failure to register a model for monitoring or reject a model monitoring request. For example, the Target Entity (or MMC) may send an AI/ML MODEL MONIOTRING REGISTRATION FAILURE (or AI/ML MODEL MONIOTRING REQUEST FAILURE) message model registration failure to the Source Entity. Additionally, the Target Entity (or MMC) may provide other assistance information related to the monitoring process of the model (or multiple models). Optionally the Target Entity may indicate to the Source Entity, the failure cause, using a newly defined appropriate cause value, for example, Cause IE "Monitoring Registration not supported", "Monitoring not accepted", or any other suitable naming.

FIG. 2 shows an example of a new class 1 AI/ML Model Monitoring Registration (or Model Functionality Monitoring Registration) procedure according to an embodiment of the disclosure.

Referring to FIG. 2, at operation S202, a Source Entity sends, for example, an AI/ML MODEL MONITORING REGISTRATION REQUEST message (or in another example AI/ML FUNCTIONALITY MONITORING REGISTRATION REQUEST, or any other naming), including model information, functionality information, resource requirement information, or other information related to model (or functionality) monitoring session, etc.

At operation S204, in response to the AI/ML MODEL MONITORING REGISTRATION REQUEST message the target entity sends an AI/ML MODEL MONITORING REGISTRATION RESPONSE/ACKNOWLEDGMENT/FAILURE MESSAGE depending on the success of the model monitoring request. The message may include one or more of monitoring related information, monitoring outcome information, a failure case value and any other relevant information, such as information which may be dependent upon the success/failure of the request.

In an example, the model or model functionality monitoring registration entity (e.g. Target Entity, or MMC) may reject model or model functionality monitoring registration request based on information (e.g. subscription information) received from the Unified Data Manager (UDM), or another network entity and/or network function, and/or, server, Edge, database, cloud, or via Application function, or OAM.

In alternative example, the model or functionality monitoring registration procedure may be defined as a new class 2 procedure, using new and/or existing messages and/or IEs, or defined using existing class 2 procedures, using new and/or existing messages and/or IEs. In an example, the model or model functionality monitoring registration procedure may be triggered based on a Source Entity request and/or other assistance information from the network. The procedure of FIG. 1 may also be defined as a new class 2 procedure in a similar manner.

Figure 3:
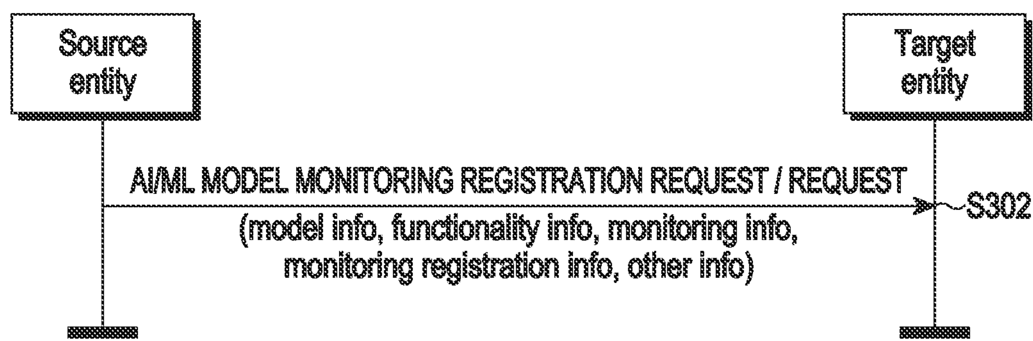
FIG. 3 provides an example of an AI/ML model (or model functionality) monitoring registration procedure according to an embodiment of the disclosure.

FIG. 3 shows an example of a new class 2 AI/ML Model Monitoring Registration (or Model Functionality Monitoring Registration) procedure according to an embodiment of the disclosure.

Referring to FIG. 3, at operation S302, the Network Entity 1 sends, for example, an AI/ML MODEL MONITORING REGISTRATION REQUEST message (or in another example AI/ML MODEL FUNCTIONALITY MONITORING REGISTRATION REQUEST, or any other naming), including model information, functionality information, or other information related to model (or model functionality) monitoring session, etc.

Referring to an example of a new class 1 AI/ML Model Monitoring Registration (or Model Functionality Monitoring Registration) procedure, in which a Source Entity sends, for example, an AI/ML MODEL MONITORING REQUEST message (or in another example AI/ML MODEL FUNCTIONALITY MONITORING REQUEST, or any other naming), including model information, functionality information, resource requirement information, or other information related to model (or functionality) monitoring session, etc., in some examples the model or model functionality monitoring registration entity (e.g. Target Entity, or MMC) may proceed to request, negotiate, and respond to a monitoring registration as follows.

1. Request for Monitoring Registration: The Source Entity (e.g., an application or service) requests monitoring registration by sending a message to the Target Entity (e.g., a network function) containing the necessary registration information.

2. Negotiation of Monitoring Registration: The Target Entity may perform negotiation with the Source Entity to finalize the model monitoring registration details. This negotiation could involve exchanging messages containing additional information or parameters required for the registration to be completed successfully.

3. Response to Monitoring Registration Request: Once the monitoring registration details are finalized, the Target Entity sends a response to the Source Entity confirming the monitoring registration or rejecting it based on specific reasons. The response message could contain additional information such as the monitoring parameters, monitoring registration expiration time, or any applicable policy rules.

4. Monitoring Period: The Source Entity starts monitoring the network function as per the model (or model functionality) monitoring registration details provided by the Target Entity. The monitoring period could be limited to a specific duration or could be a continuous process until the registration is explicitly cancelled.

5. Cancellation of Monitoring: The Source Entity can cancel the monitoring registration by sending a message to the Target Entity requesting the cancellation. The Target Entity sends a response to confirm the cancellation.

6. Expiration of Monitoring: The monitoring registration can also expire after a predefined time period, after which the Source Entity must request a new monitoring registration if required.

This procedure outlines the steps involved in requesting, negotiating, and responding to a monitoring registration between a Source Entity and a Target Entity. It can be adapted and customized as per the specific requirements of the network and entities involved and therefore may include fewer steps or additional steps.

Figure 4:
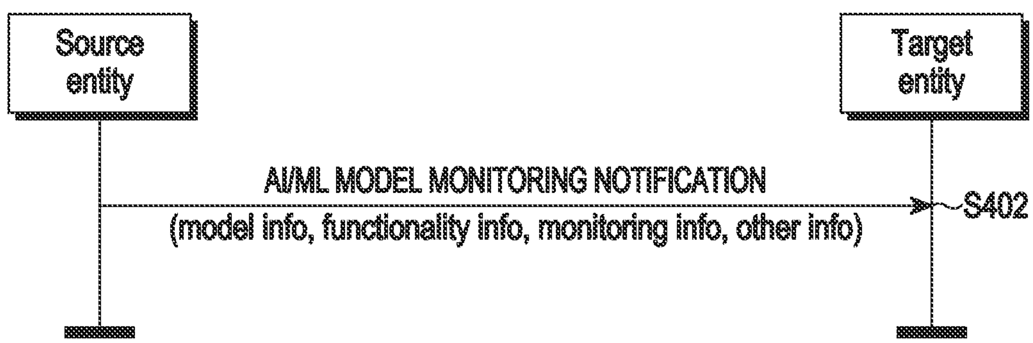
FIG. 4 provides an example of an AI/ML model (or model functionality) monitoring notification procedure according to an embodiment of the disclosure.

FIG. 4 provides an example of an AI/ML model (or model functionality) monitoring notification procedure according to an embodiment of the disclosure.

Referring to FIG. 4, at operation S402, the Network Entity 1 sends an AI/ML MODEL MONITORING NOTIFICATION message to Network Entity 2. The message may include one or more of model information, monitoring information, model registration information and any other relevant information. An AI/ML MODEL MONITORING NOTIFICATION message may be sent by a first network entity (function) to notify a second network entity (or function) to trigger a monitoring process, or that a condition or criteria or situation or event has taken place, e.g. based on a given model (or models) at the first entity that requires a monitoring process to start at the second network entity. In another example, the first network entity notifies the second network entity to trigger monitoring of a model at the first entity, or a two sided model hosted at both entities. Although first and second network entities have been described, either of them may be considered to be a source entity or a target entity and thus the notification may be transmitted in either direction.

Figure 5:
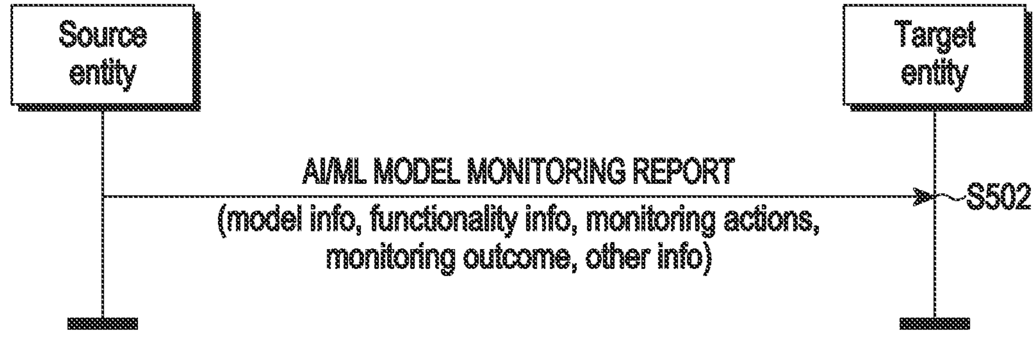
FIG. 5 provides an example of an AI/ML model (or model functionality) monitoring report procedure according to an embodiment of the disclosure.

FIG. 5 provides an example of an AI/ML model (or model functionality) monitoring report procedure according to an embodiment of the disclosure.

Referring to FIG. 5, at operation S502, the Network Entity 1 sends an AI/ML MODEL MONITORING REPORT message to the Network Entity 2 according to an embodiment of the disclosure. For example, reporting monitoring outcome, monitoring actions, monitoring parameters, monitoring information, other monitoring related information.

Figure 6:
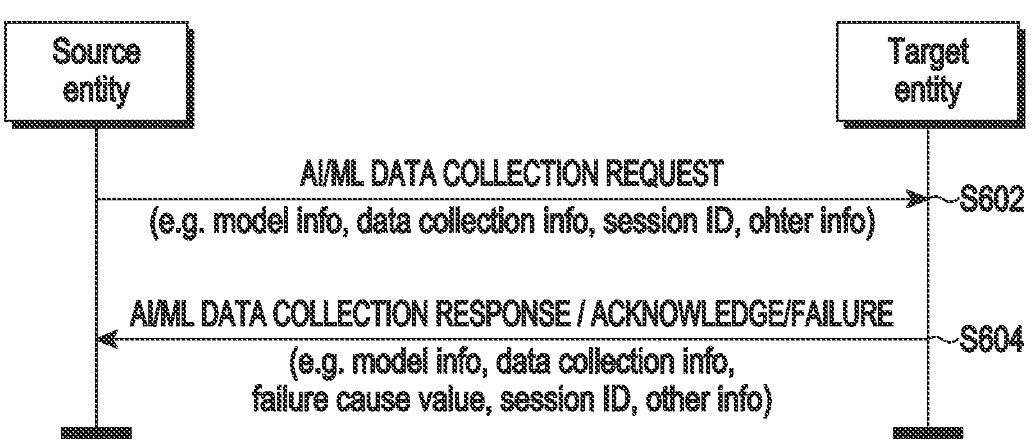
FIG. 6 provides an example of an AI/ML model (or model functionality) monitoring modification procedure according to an embodiment of the disclosure.

FIG. 6 provides an example of a Class 1, AI/ML model monitoring modification procedure according to an embodiment of the disclosure.

Referring to FIG. 6, at operation S602, an AI/ML MODEL MONITORING MODIFICATION REQUEST message is sent by the Network Entity 1 to the Network Entity 2, where the message may include one or more of the following: model information, monitoring information, monitoring registration information and any other relevant information.

At operation S604, an AI/ML MODEL MONITORING MODIFICATION RESPONSE/ACKNOWLEDGE/FAILURE message is sent by the Network Entity 2 to the Network Entity 1, where the message may include monitoring related information, monitoring outcome information, action information, a failure cause and any other relevant information, such as information which may be dependent upon the success/failure of the request.

The procedures described with reference to FIGS. 4 to 6 may be performed following those of FIGS. 1 to 3 i.e. once monitoring has commenced. Furthermore, the naming of the messages may take any appropriate form that may be different to those set out above. The labelling of the messages in this disclosure should also be taken to cover adaptations of their wording, for example, AI/ML Model Monitoring Request Response/Acknowledgement/Failure may also refer to single messages labelled AI/ML Model Monitoring Request Response, AI/ML Model Monitoring Request Acknowledgement, and AI/ML Model Monitoring Request Failure for example. Furthermore, although first and second network entities (e.g. Network Entity 1 and Network Entity 2) have been described, either of them may be considered to be a source entity or a target entity and thus the transmitted messages may be transmitted in either direction.

AI/ML Data Collection

Disclosed below are examples of proposed AI/ML data collection entities that enable the collection of data associated with AI/ML models in a wireless communications system and also example signalling that may be used to support AI/ML data collection functionality. In particular, among others, the following are described.

- A new network function and/or network entity (or a set of network functions and/or set of network entities) that is (are) involved in data collection for at least one AI/ML model (or a set of models) for various purposes of the AI/ML model operation.
- The new network function(s) and/or network entity(-ies) is (are) involved in data collection procedures for a given model (or a set of models), for example, activation/deactivation of data collection procedure, start/stop/pause of data collection procedure, or update/modification of data collection configurations, criteria, policy, or setup and/or other procedures related to data collection for a given AI/ML model (or multiple models) operations.

For example, the new network entity(-ies) and/or network function(s) perform(s) one, some, all or a combination of the following, different, and/or similar data collection actions: activate data collection, start data collection, pause data collection, stop data collection, re-start data collection, end data collection, change data collection objective/type/purpose, (re)select a model (or models) for data collection, deactivate data collection, report outcome of data collection, notify of availability of data collection (reports, measurements, other) at least at one network entity (or network function), notify of data collection event, etc.

New signalling procedures, messages, and/or IEs to support the data collection for AI/ML model operation considering the above newly introduced network function(s)/network entities. For example, data collection for model monitoring purpose, or other AI/ML management purposes.

These and other aspects of AI/ML data collection are described in detail below.

AI/ML Data Collection Entity

Although the examples of network entities/network functions that can provide AI/ML data collection are described separately below, their functionality may be combined into a single network entity/function and/or distributed across one or more network entities/functions.

In one example, the new network entity and/or network function provides data, to at least one network entity and/or network function, that uses the collected data for monitoring purposes (of operation or performance, etc.) of a given model (or multiple models) that is/are stored in at least one (new/existing) network entity and/or function.

In one related example, the new network entity and/or network function indicates to the network entity and/or network function that performs the monitoring that the sent/forwarded/provided data is for monitoring purpose.

In one example, one (or more) network entity(-ies) (and/or network functions) exchange capabilities related to the network entity (-ies) (and/or function(s)) support of data collection procedure for an AI/ML model (or models). In a related example, the capability support can be for general data collection for a model (or models) and/or capability support per model functionality (or per use case, sub-use case, configuration, scenario, etc.).

In another example, the data collection capability support may indicate the network entity capability to support data collection for a given AI/ML model operation, for example, general capability to support data collection for all AI/ML operations, and/or specific capability to support data collection for a given AI/ML operation, or give purpose, for example, data collection for monitoring, training, update, activation, deactivation, switching, fallback, or any other model related operation and/or model management cycle. In another example, data collection capability for model delivery and/or model transfer from a given network entity (and/or function) to at least another network entity (and/or function).

In one example, data collection for a given AI/ML model (or multiple models) maybe triggered by at least one (new or existing) network entity and/or network function. In one example, the indication or triggering or activation (or start) of data collection procedure maybe based on an event, a reconfigured threshold, a policy, a condition, or other assistance information from at least one (new or existing) network entity and/or function. For example, the data collection at a network entity (or function) at a given UE (or a group of UEs) may be triggered by the network (RAN, CN, both) or the UE itself, or both the network and the UE. In another*r example, the triggering of data collection at the UE and/or the network is by a server, or application.

AI/ML Data Collection Signalling

Some of the actions that may be taken by network entities/functions (e.g. source and target network entities or first and second network entities) that participate in AI/ML data collection set out in the following examples.

In an example, the new (or existing) network entity selects at least one AI/ML model, which may be hosted/stored, in the same and/or at least another network entity, for monitoring purposes. Optionally, the network entity activates the data collection procedure, in the same and/or at least another network entity, for collection of data for monitoring purposes for the selected model.

In an example, the new (or existing) network entity that hosts/stores a model triggers/activates a data collection procedure in the same network entity and/or in at least another network entity.

In an example, the new (or existing) network entity that hosts/stores a model starts, stops, pauses, resumes or ends a data collection procedure in the same network entity and/or in at least another new (or existing) network entity.

In an alternative example, the new (or existing) network entity that hosts/stores model requests at least another new (or existing) network entity to start, stop, pause, resume or end a data collection procedure in the same network entity and/or in at least another new (or existing) network entity.

In an example, the new (or existing) network entity that hosts/stores a model deactivates a data collection procedure in the same network entity and/or in at least another network entity.

In an example, the new (or existing) network entity that hosts/stores a model may perform update or modification of data collection procedure of at least one model, in the same network entity and/or in at least another network entity.

In an example, the new (or existing) network entity may perform/request another entity to perform fallback or switch of a data collection procedure to at least another model, in the same network entity and/or in at least another network entity.

FIGS. 7 to 13 provide signalling procedures that are based on the foregoing examples of data collection-based actions and signalling at and/or between network entities/functions.

Figure 7:
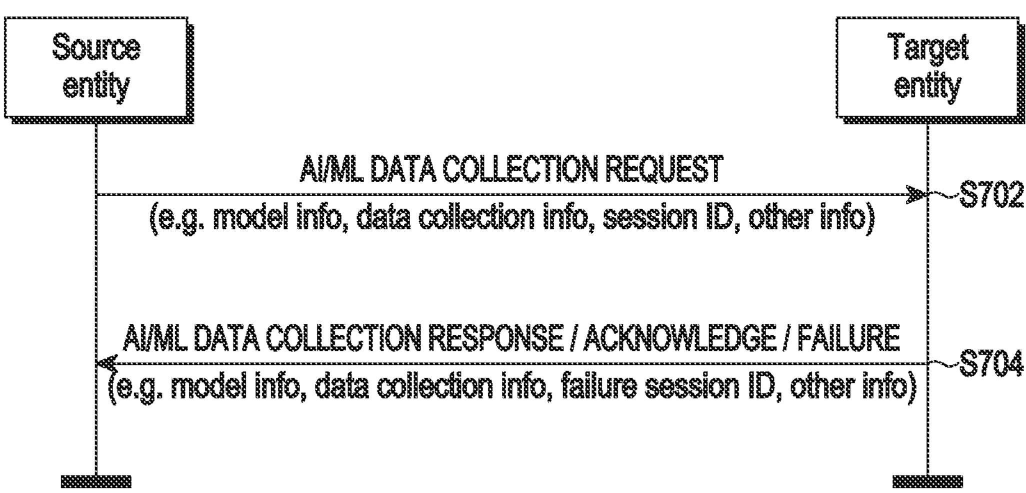
FIG. 7 provides an example of an AI/ML data collection procedure according to an embodiment of the disclosure.

FIG. 7 provides an example class 1 data collection signalling procedure according to an embodiment of the disclosure.

Referring to FIG. 7, at operation S702, the Network Entity 1 sends an AI/ML DATA COLLECTION REQUEST message to a Network Entity 2, where the message may include one or more of model information, functionality information, data collection information, a session ID and any other relevant information. At operation S704, in response to the AI/ML DATA COLLECTION REQUEST message, the Network 2 sends an Entity AI/ML DATA COLLECTION RESPONSE/ACKNOWLEDGE/FAILURE message acknowledging the data collection request, approving the request or indicating failure of the request, where the message may include one or more of model information, functionality information, data collection information, a failure cause value, a session ID and/or any other relevant information.

Figure 8:
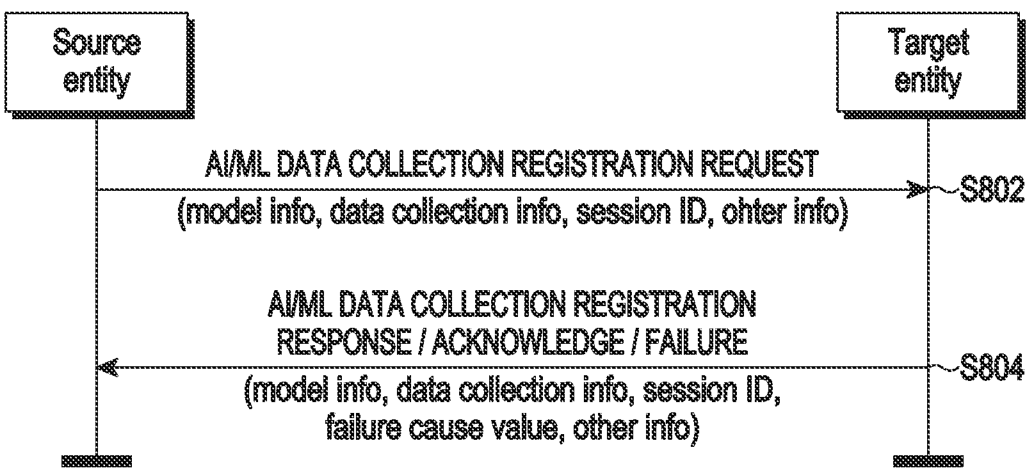
FIG. 8 provides an example of an AI/ML data collection registration procedure according to an embodiment of the disclosure.

FIG. 8 provides an example class 1 data collection signalling procedure according to an embodiment of the disclosure.

Referring to FIG. 8, at operation S802, the Network Entity 1 sends an AI/ML DATA COLLECTION REGISTRATION REQUEST message to a Network Entity 2, where the message may include one or more of model information, functionality information, data collection information, a session ID and/or any other relevant information. At operation S804, in response to the AI/ML DATA COLLECTION REGISTRATION REQUEST message, the Network Entity 2 sends an AI/ML DATA COLLECTION REGISTRATION RESPONSE/ACKNOWLEDGE/FAILURE message acknowledging the request (the AI/ML DATA COLLECTION ACKNOWLEDGE message), approving of or indicating success for the data collection registration request (the AI/ML DATA COLLECTION RESPONSE message, or indicating failure of the request (the AI/ML DATA COLLECTION FAILURE message), where the message may include one or more of model information, functionality information, data collection information, a failure cause value (the AI/ML DATA COLLECTION FAILURE message), a session ID and/or any other relevant information.

Figure 9:
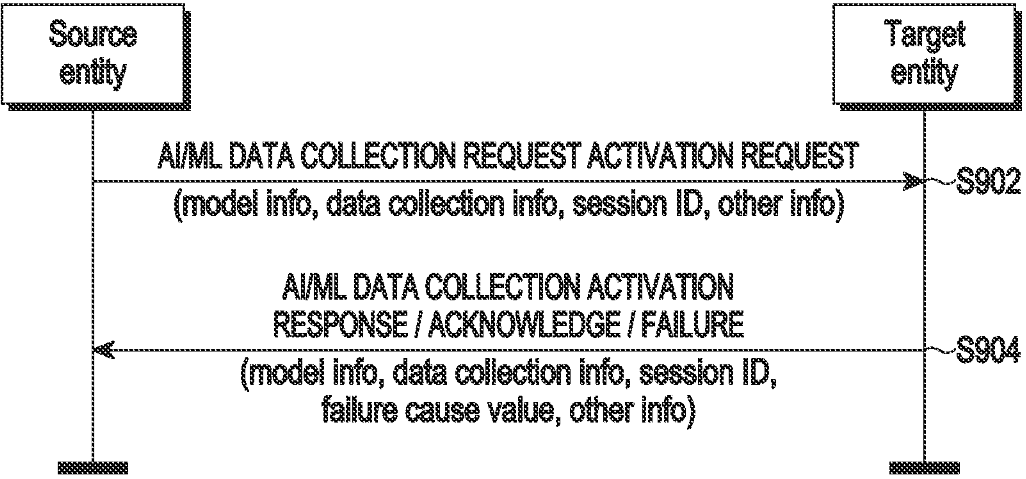
FIG. 9 provides an example of an AI/ML data collection activation procedure according to an embodiment of the disclosure.

FIG. 9 provides an example class 1 data collection signalling procedure according to an embodiment of the disclosure.

Referring to FIG. 9, at operation S902, the Network Entity 1 sends an AI/ML DATA COLLECTION ACTIVATION REQUEST message to a Network Entity 2, where the message may include one or more of model information, functionality information, data collection information, a session ID and any other relevant information. At operation S904, in response to the AI/ML DATA COLLECTION ACTIVATION REQUEST message, the Network Entity 2 sends an AI/ML DATA COLLECTION ACTIVATION RESPONSE/ACKNOWLEDGE/FAILURE message acknowledging the request, approving the data collection activation request or indicating failure of the request, where the message may include one or more of model information, data collection information, functionality information, a failure cause value, a session ID and/or any other relevant information.

Figure 10:
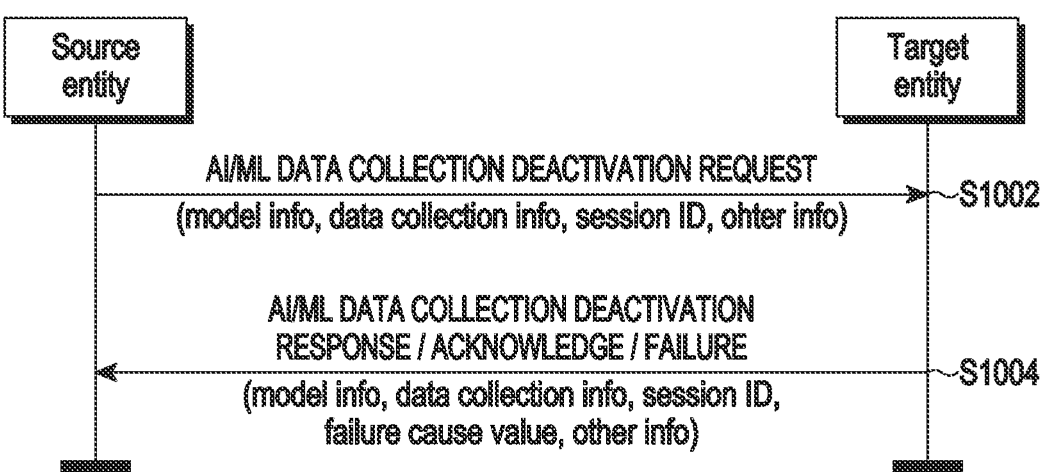
FIG. 10 provides an example of an AI/ML data collection deactivation procedure according to an embodiment of the disclosure.

FIG. 10 provides an example class 1 data collection signalling procedure according to an embodiment of the disclosure.

Referring to FIG. 10, at operation S1002, the Network Entity 1 sends an AI/ML DATA COLLECTION DEACTIVATION REQUEST message to a Network Entity 2, where the message may include one or more of model information, functionality information, data collection information, a session ID and/or any other relevant information. At operation S1004, in response to the AI/ML DATA COLLECTION DEACTIVATION REQUEST message, the Network Entity 2 sends an AI/ML DATA COLLECTION DEACTIVATION RESPONSE/ACKNOWLEDGE/FAILURE message acknowledging the data collection deactivation request, approving the request or indicating failure of the request, where the message may include one or more of model information, functionality information, data collection information, a failure cause value, a session ID and/or any other relevant information.

Figure 11:
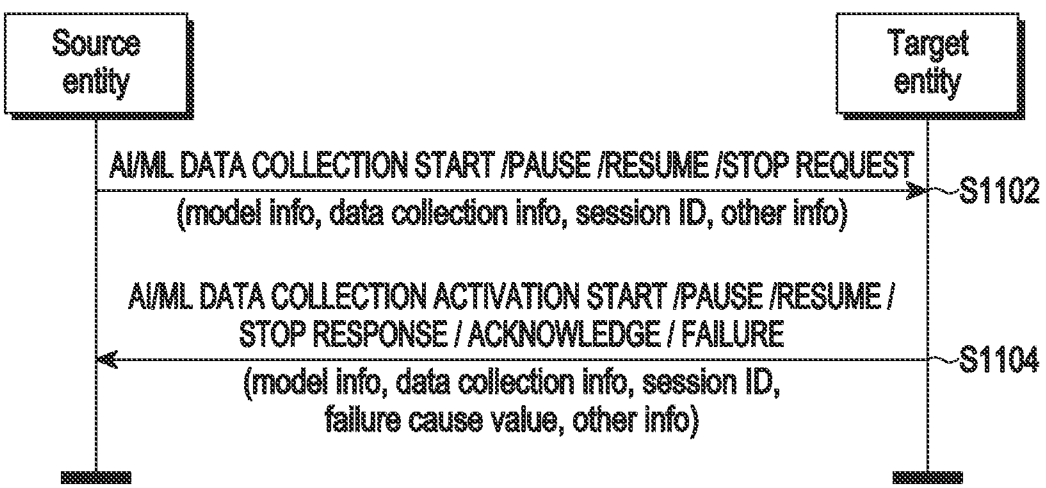
FIG. 11 provides an example of an AI/ML data collection start/pause/resume/stop procedure according to an embodiment of the disclosure.

FIG. 11 provides an example class 1 data collection signalling procedure according to an embodiment of the disclosure.

Referring to FIG. 11, at operation S1102, the Network Entity 1 sends an AI/ML DATA COLLECTION START/PAUSE/RESUME/STOP REQUEST message to a Network Entity 2, where the message may include one or more of model information, functionality information, data collection information, a session ID and any other relevant information. At operation S1104, in response to the AI/ML DATA COLLECTION START/PAUSE/RESUME/STOP REQUEST message, the Network Entity 2 sends an AI/ML DATA COLLECTION START/PAUSE/RESUME/STOP RESPONSE/ACKNOWLEDGE/FAILURE message acknowledging the request, approving the request or indicating failure of the request, where the message may include one or more of model information, functionality information, data collection information, a failure cause value, a session ID and any other relevant information.

Figure 12:
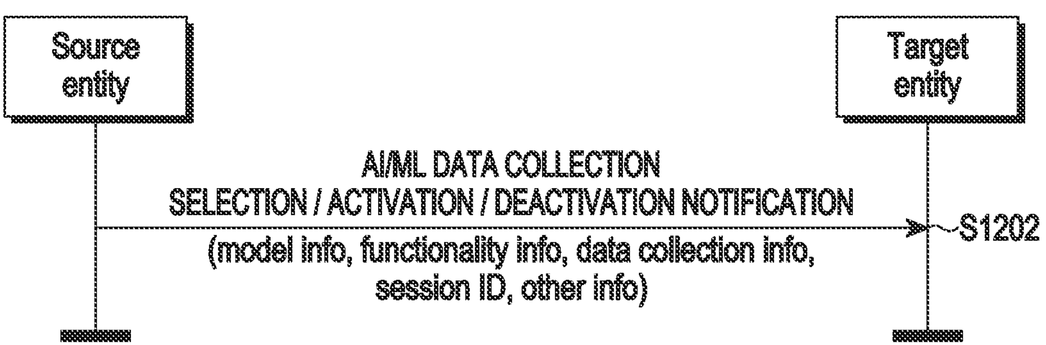
FIG. 12 provides an example of an AI/ML data collection selection/activation/deactivation notification procedure according to an embodiment of the disclosure.

FIG. 12 provides an example class 2 data collection signalling procedure according to an embodiment of the disclosure.

Referring to FIG. 12, at operation S1202, the Network Entity 1 sends an AI/ML DATA COLLECTION SELECTION/ACTIVATION/DEACTIVATION NOTIFICATION message to a Network Entity 2, where the message may include one or more of model information, functionality information, data collection information, a session ID and any other relevant information. The Network Entity 2 may then implement the selection/activation/deactivation.

Figure 13:
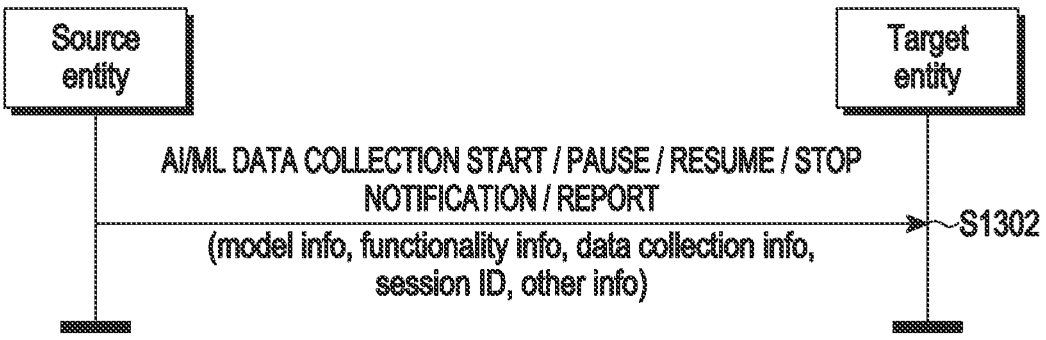
FIG. 13 provides an example of an AI/ML data collection start/pause/resume/stop notification (or report) procedure according to an embodiment of the disclosure.

FIG. 13 provides an example class 1 data collection signalling procedure according to an embodiment of the disclosure.

Referring to FIG. 13, at operation S1302, the Network Entity 1 sends an AI/ML DATA COLLECTION START/PAUSE/RESUME/STOP NOTIFICATION message to a Network Entity 2, where the message may include one or more of model information, data collection information, a session ID and any other relevant information. The Network Entity 2 may then implement the start/pause/resume/stop of the data collection.

In all above examples, data collection may be performed separately, in parallel, at the start of, during, at the end of, of model monitoring stage. Furthermore, as with the signaling described with respect to FIGS. 1 to 6, the procedures of FIGS. 7 to 13 may be combined one after each other and therefore may be implemented in combination. For example, the procedures of FIGS. 7 and 9 to 13 may following the registration procedure of FIG. 8. Similarly, the procedures of FIGS. 9 to 13 may follow that of FIG. 7. Furthermore, although first and second network entities (e.g. Network Entity 1 and Network Entity 2) have been described, either of them may be considered to be a source entity or a target entity and thus the transmitted messages may be transmitted in either direction.

In one example, one (or more) network entity(-ies) and/or network function(s) involved in monitoring of one (or more) AI/ML model may trigger or activate a data collection procedure, for monitoring model purposes, in one (or more) network entity(-ies) and/or network function(s) that are involved (directly or indirectly) in the model monitoring procedure.

In another example, one (or more) network entity(-ies) and/or network function(s) involved in monitoring of one (or more) AI/ML model may notify, report, or indicate to another/other network entity(-ies) and/or network function(s) to trigger or activate data collection procedure, for monitoring model purposes, in one (or more) network entity(-ies) and/or network functions that are involved (directly or indirectly) in the model monitoring procedure. In a related example, the notification to activate data collection for model monitoring purpose may be sent to one (or more) network entity(-ies) and/or network function(s) that may or may not be involved in the model monitoring procedure (e.g. UDM, database, server, other).

Below is an example modification that may be made to [4] based on the above described examples.

New IEs Monitoring Request (ASN.1):

AIMLMonitoringRequest::=ENUMERATED {ue, network, both, start, stop, . . . }

AIMLMonitoringResponse::=ENUMERATED {ue, network, both, start, stop, . . . }

AIMLMonitoringReportingFrequency::=INTEGER (1.. XXX, . . . )

New Added Text on Monitoring Request:

For each AI/ML model, if the AIML Monitoring Request IE was included in the AIML Model Parameters IE, contained in AI/ML MODEL MONIOTRING REGISTRATION REQUEST message or AI/ML MODEL MONIOTRING REQUEST message, the NG-RAN node shall store this information, and, if supported, perform model monitoring.

If the AIML Monitoring Reporting Frequency IE was included in the AIML Model Parameters IE, contained in the AI/ML MODEL MONIOTRING REGISTRATION REQUEST message or AI/ML MODEL MONIOTRING REQUEST message, the NG-RAN node shall store this information and, if supported, use it for RAN reporting frequency of model monitoring process.

Example 1: AI/ML Model Monitoring Parameters

This IE defines the monitoring parameters to be applied to an AI/ML model.

| IE/Group Name | Presence | Range | IE type and reference | Semantics description | Criticality | Assigned Criticality |
|---|---|---|---|---|---|---|
| Source Entity ID (or Network Entity 1 ID) | M | | | | — | |
| Target Entity ID (or Network Entity 2 ID) | M | | | | — | |
| Monitoring Session ID | M | | | | — | |
| Model ID (or list of model IDs) | M | | | | — | |
| Functionality ID (or list of functionalities IDs) | M | | | | — | |
| Model identification type | O | | ENUMERATED (model-ID-based, functionality-based-ID, both, other) | Model identification is model-ID-based, functionality-based, both, or other | | |
| Model information | O | | | | YES | ignore |
| Functionality information | O | | | | YES | ignore |
| AIML Monitoring Request | O | | ENUMERATED (UE-side, NW-side, two-sided, start, stop, pause, resume, other) | Indicates to monitor model at UE-side, NW-side, both sides (two-sided), or to start or stop the corresponding AI/ML model monitoring process. | YES | ignore |
| AIML Monitoring Registration Request | O | | ENUMERATED (UE-side, NW-side, two-sided) | Indicates to register a model for monitoring at UE-side, NW-side, both sides (two-sided). | YES | ignore |
| AIML Monitoring Reporting Frequency | O | | INTEGER (1 . . . xx, . . . ) | Indicates the reporting frequency AI/ML model monitoring. Units: second, minutes, other | YES | ignore |

-continued

| IE/Group Name | Presence | Range | IE type and reference | Semantics description | Criticality | Assigned Criticality |
|---|---|---|---|---|---|---|
| AIML Monitoring Information | O | | xxx | Indicates other parameters and information relate to the AI/ML model monitoring. | YES | ignore |

New IEs Data Collection (ASN.1):

AIMLDataCollectionRequest::=ENUMERATED {ue, network, both, start, stop, . . . }

AIMLDataCollectionResponse::=ENUMERATED {ue, network, both, start, stop, . . . }

AIMLDataCollectionReportingFrequency::=INTEGER (1.. XXX, . . . )

AIMLDataCollectionPurpose::=ENUMERATED {monitoring, update, training, other, . . . }

New Added Text on Data Collection:

For each AI/ML model, if the AIML Data Collection Request IE was included in the AIML Model Parameters IE, contained in AI/ML MODEL DATA COLLECTION REGISTRATION REQUEST message or AI/ML MODEL DATA COLLECTION REQUEST message, the NG-RAN node shall store this information, and, if supported, perform data collection.

If the AIML Data Collection Reporting Frequency IE was included in the AIML Model Parameters IE, contained in the AI/ML MODEL DATA COLLECTION REGISTRATION REQUEST message or AI/ML MODEL DATA COLLECTION REQUEST message, the NG-RAN node shall store this information and, if supported, use it for RAN reporting frequency of data collection process.

Example 2: AI/ML Model Data Collection Parameters

| IE/Group Name | Presence | Range | IE type and reference | Semantics description | Criticality | Assigned Criticality |
|---|---|---|---|---|---|---|
| Network Entity 1 ID | M | | | | — | |
| Network Entity 2 ID | M | | | | — | |
| Data Collection Session ID | M | | | | — | |
| Model ID (or list of model IDs) | M | | | | — | |
| Functionality ID (or list of functionalities IDs) | M | | | | — | |
| Model identification type | O | | ENUMERATED (model-ID-based, functionality-based-ID, both, other) | Model identification is model-ID-based, functionality-based, both, or other | YES | ignore |
| Model information | O | | | | YES | ignore |
| Functionality information | O | | | | YES | ignore |
| Data collection purpose | O | | ENUMERATED (Monitoring, Update, Training, Selection, Activation, Deactivation, Switching, Fallback, other) | Indicates the purpose of data collection procedure for a given model. For example, for Monitoring, Update, Training, Selection, Activation, Deactivation, Switching, Fallback, other purpose. | | |

-continued

| IE/Group Name | Presence | Range | IE type and reference | Semantics description | Criticality | Assigned Criticality |
|---|---|---|---|---|---|---|
| Data collection type | O | | ENUMERATED (online, offline, other) | Indicates to perform data collection for a given model online, offline, or other type. | | |
| AIML Data Collection Request | O | | ENUMERATED (UE-side, NW-side, two-sided, start, stop, resume, pause, other) | Indicates to perform data collection for a given model at UE-side, NW-side, both sides (two-sided), or to start or stop the corresponding AI/ML data collection process. | YES | ignore |
| AIML Data Collection Registration Request | O | | ENUMERATED (UE-side, NW-side, two-sided) | Indicates to register a model for data collection at UE-side, NW-side, both sides (two-sided). | YES | ignore |
| AIML Data Collection Reporting Frequency | O | | INTEGER (1 . . . xx, . . . ) | Indicates the reporting frequency of AI/ML data collection process. Units: second, minutes, other | YES | ignore |
| AIML Data Collection information | O | | xxx | Indicates other parameters and information relate to the data collection process of AI/ML model(s). | YES | ignore |

In another example, the monitoring parameters and data collection parameters tables may be combined in the same table, and named, "AI/ML Model Monitoring Parameters", or AI/ML Model Data Collection Parameters", or AI/ML Model Parameters", or any other suitable naming.

Figure 14:
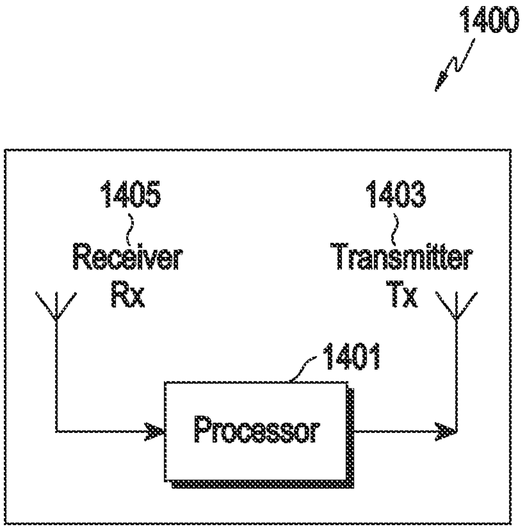
FIG. 14 provides a block diagram of a network entity/function according to an embodiment of the disclosure.

FIG. 14 is a block diagram of a network entity/function that may be used in connection with the techniques disclosed in relation to any of the preceding figures according to an embodiment of the disclosure.

For example, the source entity, target entity or equivalents (e.g. network entity, network function etc.) may be provided in the form of the network entity illustrated in FIG. 14. The skilled person will appreciate that a network entity/function may be implemented, for example, as a network element on a dedicated hardware, as a software instance running on a dedicated hardware, and/or as a virtualized function instantiated on an appropriate platform, e.g. on a cloud infrastructure.

Referring to FIG. 14, an entity 1400 comprises a processor (or controller) 1401, a transmitter 1403 and a receiver 1405. The receiver 1405 is configured for receiving one or more messages from one or more other network entities, for example as described above. The transmitter 1403 is configured for transmitting one or more messages to one or more other network entities, for example as described above. The processor 1401 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the disclosure may be implemented in the form of hardware, software or any combination of hardware and software. Any such software may be stored in the form of volatile or non-volatile storage, for example a storage device like a read only memory (ROM), whether erasable or rewritable or not, or in the form of memory such as, for example, random access memory (RAM), memory chips, device or integrated circuits or on an optically or magnetically readable medium such as, for example, a compact disc (CD), digital versatile disc (DVD), magnetic disk or magnetic tape or the like.

It will be appreciated that the storage devices and storage media are embodiments of machine-readable storage that are suitable for storing a program or programs comprising instructions that, when executed, implement certain examples of the disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method for supporting artificial intelligence/machine learning (AI/ML) performed by a first base station in a wireless communication system, the method comprising:
- transmitting, to a second base station, a data collection request message related to data collection for supporting the AI/ML; and
- receiving, from the second base station, a data collection response message based on a successful operation related to the data collection,
- wherein the data collection request message includes:
  - information indicating a frequency for reporting related to the data collection,
  - information indicating whether the data collection is to be performed at a user equipment (UE)-side, a network-side, or both the UE-side and the network-side,
  - information indicating whether an AI/ML model for the data collection is registered at the UE-side, the network-side or both the UE-side and the network-side,
  - information indicating whether the AI/ML model is identified based on an identifier of the AI/ML model, functionality of the AI/ML model or both the identifier and the functionality of the AI/ML model,
  - information indicating a purpose of the data collection among a plurality of predefined purposes including monitoring of a given AI/ML model, updating of the given AI/ML model, training of the given AI/ML model, activation of the given AI/ML model, deactivation of the given AI/ML model, and switching of the given AI/ML model to at least one another AI/ML model, and
  - information indicating whether the data collection is performed through online, or offline.

2. The method of claim 1, further comprising:
- receiving, from the second base station, a data collection failure message based on an unsuccessful operation related to the data collection,
- wherein the data collection failure message includes a failure cause value.

3. The method of claim 1, wherein the data collection request message includes information indicating a start related to the data collection, or information indicating a stop related to the data collection.

4. The method of claim 1, further comprising:
- transmitting, to the second base station, a data collection registration request message including a data collection registration request; and
- in response to transmitting the data collection registration request message, receiving, from the second base station, a data collection registration response message indicating success or failure of the data collection registration request.

5. The method of claim 4, wherein the data collection request message and the data collection registration request message include one or more of AI/ML model/functionality information, a data collection reporting frequency, AI/ML data collection information, an AI/ML data collection purpose, an identification (ID) associated with the data collection, and a session ID.

6. The method of claim 4, wherein the data collection response message and the data collection registration response message include one or more of AI/ML model/functionality information, AI/ML data collection information, a session identification (ID), an ID associated with data collection, an AI/ML data collection purpose, and a failure cause value.

7. An apparatus for a first base station for supporting artificial intelligence/machine learning (AI/ML) in a wireless communication system, the apparatus comprising:
- a transceiver;
- memory; and
- one or more processors coupled to the transceiver and the memory,
- wherein the memory stores one or more computer programs including computer-executable instructions that, when executed by the one or more processors, cause the apparatus to perform operations, the operations comprising:
  - transmitting, to a second base station, a data collection request message related to data collection for supporting the AI/ML, and
  - receiving, from the second base station, a data collection response message based on a successful operation related to the data collection, and
- wherein the data collection request message includes:
  - information indicating a frequency for reporting related to the data collection,
  - information indicating whether the data collection is to be performed at a user equipment (UE)-side, a network-side, or both the UE-side and the network-side,
  - information indicating whether an AI/ML model for the data collection is registered at the UE-side, the network-side or both the UE-side and the network-side,
  - information indicating whether the AI/ML model is identified based on an identifier of the AI/ML model, functionality of the AI/ML model or both the identifier and the functionality of the AI/ML model,
  - information indicating a purpose of the data collection among a plurality of predefined purposes including monitoring of a given AI/ML model, updating of the given AI/ML model, training of the given AI/ML model, activation of the given AI/ML model, deactivation of the given AI/ML model, and switching of the given AI/ML model to at least one another AI/ML model, and
  - information indicating whether the data collection is performed through online, or offline.

8. The apparatus of claim 7, wherein the operations further comprise:

receiving, from the second base station, a data collection failure message based on an unsuccessful operation related to the data collection, wherein the data collection failure message includes a failure cause value.

9. The apparatus of claim 7, wherein the data collection request message includes information indicating a start related to the data collection, or information indicating a stop related to the data collection.

10. The apparatus of claim 7, wherein the operations further comprise:

transmitting, to the second base station, a data collection registration request message including a data collection registration request; and in response to transmitting the data collection registration request message, receiving, from the second base station, a data collection registration response message indicating success or failure of the data collection registration request.

11. The apparatus of claim 10, wherein the data collection request message and the data collection registration request message include one or more of AI/ML model/functionality information, a data collection reporting frequency, AI/ML data collection information, an AI/ML data collection purpose, an identification (ID) associated with the data collection, and a session ID.

12. The apparatus of claim 10, wherein the data collection response message and the data collection registration response message include one or more of AI/ML model/functionality information, AI/ML data collection information, a session identification (ID), an ID associated with data collection, an AI/ML data collection purpose, and a failure cause value.

13. One or more non-transitory computer-readable storage media storing instructions which, when executed by at least one processor of an apparatus of a first base station, cause the first base station to perform operations, the operations comprising:

transmitting, to a second base station, a data collection request message related to data collection for supporting an artificial intelligence/machine learning (AI/ML); and receiving, from the second base station, a data collection response message based on a successful operation related to the data collection, and wherein the data collection request message includes:

information indicating a frequency for reporting related to the data collection, information indicating whether the data collection is to be performed at a user equipment (UE)-side, a network-side, or both the UE-side and the network-side, information indicating whether an AI/ML model for the data collection is registered at the UE-side, the network-side or both the UE-side and the network-side, information indicating whether the AI/ML model is identified based on an identifier of the AI/ML model, functionality of the AI/ML model or both the identifier and the functionality of the AI/ML model, information indicating a purpose of the data collection among a plurality of predefined purposes including monitoring of a given AI/ML model, updating of the given AI/ML model, training of the given AI/ML model, activation of the given AI/ML model, deactivation of the given AI/ML model, and switching of the given AI/ML model to at least one another AI/ML model, and information indicating whether the data collection is performed through online, or offline.

14. The one or more non-transitory computer-readable storage media of claim 13, wherein the operations further comprise:

receiving, from the second base station, a data collection failure message based on an unsuccessful operation related to the data collection, wherein the data collection failure message includes a failure cause value.

15. The one or more non-transitory computer-readable storage media of claim 13, wherein the data collection request message includes information indicating a start related to the data collection, or information indicating a stop related to the data collection.

16. The one or more non-transitory computer-readable storage media of claim 13, wherein the operations further comprise:

transmitting, to the second base station, a data collection registration request message including a data collection registration request; and in response to transmitting the data collection registration request message, receiving, from the second base station, a data collection registration response message indicating success or failure of the data collection registration request.

17. The one or more non-transitory computer-readable storage media of claim 16, wherein the data collection request message and the data collection registration request message include one or more of AI/ML model/functionality information, a data collection reporting frequency, AI/ML data collection information, an AI/ML data collection purpose, an identification (ID) associated with the data collection, and a session ID.

* * * * *